Jan. 9, 1934. L. Q. MOFFITT 1,942,721
FLEXIBLE CONNECTION
Filed March 12, 1932
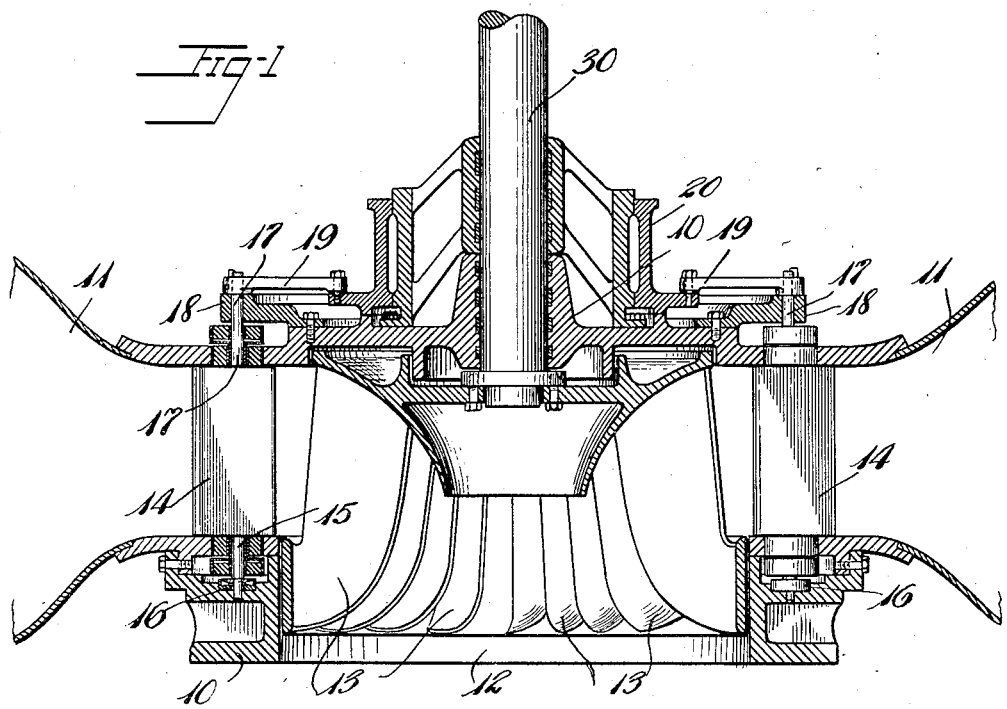
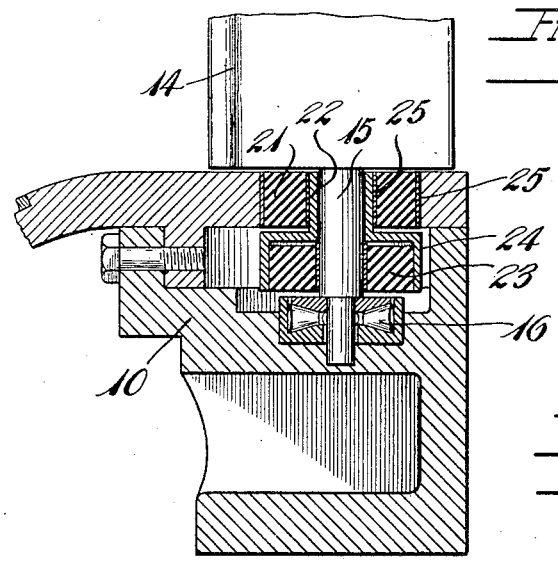
Inventor
Lucian Q. Moffitt
By Eakin & Avery
Attys.

Patented Jan. 9, 1934

1,942,721

UNITED STATES PATENT OFFICE 1,942,721

FLEXIBLE CONNECTION

Lucian Q. Moffitt, Akron, Ohio, assignor to The B. F. Goodrich Company, New York, N. Y., a corporation of New York Application March 12, 1932. Serial No. 598,453

4 Claims. (Cl. 253—122)

This invention relates to flexible connections providing for relative movement between associated parts, and especially to connections between fluid-containing casings and movable parts in contact with the fluid. The invention is particularly well suited to the connections between the movable gates or vanes of hydraulic turbines and the associated gate casings, although it will be understood that its field of utility is not so limited.

Chief among the objects of the invention are to provide for avoidance of sliding surfaces at the connection, especially of sliding metal surfaces that are subject to corrosion and excessive wear, and of sliding surfaces which are in contact with fluids and are difficultly lubricated; to provide for fluid tightness of the connection; to provide a structure that is compact and rugged and that requires infrequent attention for cleaning or repair; and to provide these characteristics together with facility of relative movement in a connection between a casing and a member positioned within and controlled from outside the casing.

These and further objects will be apparent from the following description, reference being had to the accompanying drawing, in which:

Fig. 1 is a vertical section of a hydraulic turbine constructed according to and embodying the invention in its preferred form, parts being broken away.

Fig. 2 is a view on an enlarged scale of a portion of the apparatus shown in Fig. 1.

In the drawing is illustrated a hydraulic turbine of the reaction type comprising a casing 10 having a peripheral inlet passage 11 and an axial discharge opening 12, between which is mounted for rotation on a vertical axis a turbine runner or wheel comprising the usual blades 13, 13 positioned in the path of the water, and a drive shaft 30 rotatably mounted in the casing 10.

Around the periphery of the runner, in the peripheral inlet passage 11, are mounted for angular movement about vertical axes a plurality of the customary guide vanes or gates 14, 14 for guiding and regulating the flow of water to the runner. Each gate has a lower pivot pin or pintle 15 extending into the casing and having at its lower end a thrust bearing 16 which is preferably of the roller or ball type, and an upper pivot pin 17 extending through the casing and journalled in a bracing ring 18 secured to the casing. Rigidly attached to the upper end of pin 17 is one end of a transversely extending lever 19 pivoted at its other end to a shifting ring 20 mounted upon the casing for angular movement relative thereto concentric with the runner for the purpose of adjusting all the gates simultaneously in known manner.

According to the invention, there is provided at each gate pivot pin a bushing structure that has, among other advantageous characteristics, fluid tightness, and requires no lubrication. At the lower pivot pin 15 the casing 10 is formed with an enlarged aperture through which the pin 15 extends concentric to the thrust bearing 16 which is mounted in a suitable recess in the casing. Preferably, this portion of the casing is made of detachable sections, as shown, to afford accessibility to the thrust bearing from below without disassembly of the remainder of the mounting. Between the wall of the casing aperture and the pivot pin is positioned an annular body 21 of yieldable material, preferably resilient rubber composition, secured to the wall of the casing aperture and to the outer surface of a sleeve 22 surrounding and rotatable with relation to the pin, the body 21 being adapted to yield in torsion on angular movement of the sleeve 22, and preferably being held compressed between the sleeve and the wall.

The arrangement is such that the sleeve 22 is angularly moved on turning of the pivot pin, but instead of securing the sleeve directly to the pin, it is preferred to interpose at least one more annular yieldable body 23, preferably also of resilient rubber, in series with the body 21, so that the cumulative yieldabilities of the bodies may be utilized to provide a large angular displacement for the gate without imposing undue torsional stress on the yielding material. For this purpose and for the sake of compactness of the structure the sleeve 22 is enlarged at its lower end to provide a cup-like portion 24 housing the second yieldable body 23 which lies between the inner side wall of the said portion 24 and the pivot pin and is secured to both, the turbine casing being suitably recessed to accommodate this structure.

In order to provide for convenience and strength of attachment of the rubber to the pivot pin, to the sleeve and to the casing, the rubber may be provided with shells 25, 25 to which the rubber may be secured in any suitable manner, preferably by vulcanized adhesion. The shells in turn may be locked with the respective surfaces of the pin, the sleeve and the casing by any suitable fluid tight means, such as by a screw threaded engagement, by brazing or welding or by a force-fit. The vertical thickness of each rubber body and extent of surface bonding is such as to provide adequate strength against rupture from the pressure of the fluid, as the differential fluid pressures acting upon the rubber blocks are individual to them respectively and are not cumulative or additive for dislodgment of the assembly as a whole, although their effect in permitting relative rotative movement of the gate in the casing is additive.

The upper pivot pin 17, which passes through the casing, is provided with a yieldable mounting similar to that above described for the lower pin, the two mounting structures being, however, inverted top for bottom, whereby the cupped portion of the sleeve in the upper mounting may be located outside of the casing for freedom of its movement, as shown in Fig. 1.

As the mountings thus provided are fluid tight the necessity for glands and packing at the pivot pins is eliminated, and with the exception of the thrust bearings 16, which, however, are accessible for overhaul and lubrication without disassembly of the yieldable bushings, the mountings require no lubrication and little or no attention for cleaning, or overhaul, the pivotal movements being effected simply by flexure of the rubber without the wear incident to sliding surfaces.

Variations may be made without departing from the scope of the invention as it is defined in the following claims:

What is claimed is:

1. A hydraulic turbine comprising, in combination, a gate casing having vertically aligned apertures, a gate having vertically aligned pintles positioned in the apertures, means flexibly connecting the pintles and the casing in fluid sealing relation comprising annular bodies of rubber surrounding the pintles and secured thereto and to the casing, and a thrust bearing associated with the casing and one of the pintles in such relation as to be accessible while leaving the said connecting means intact.

2. A hydraulic turbine comprising, in combination an apertured gate casing, a gate having a pintle extending into the casing aperture, means flexibly connecting the pintle and the casing in fluid sealing relation comprising an annular body of rubber positioned in the aperture and secured at its outer periphery to the casing, a second annular body of rubber spaced axially from the first body and secured at its inner periphery to the pintle, and a sleeve secured to the inner periphery of the first body and to the outer periphery of the second body.

3. A flexible fluid-seal connection comprising a casing having an apertured wall, a member extending through the aperture and movable with relation to the casing, a sleeve enclosing said member and movable with relation to the sleeve and casing, said sleeve having portions of relatively small and large diameters, a body of rubber between the inner face of the sleeve at its large diameter and the enclosed member, and a second body of rubber between the outer face of the sleeve at its small diameter and the casing, the bodies of rubber being held to the member, sleeve and casing in such relation as to permit relative movement thereof by flexure of the rubber and to provide a fluid seal.

4. A flexible connection comprising a pair of spaced apart members arranged for relative pivotal movement, a sleeve enclosing one of said members and movable with relation to both of said members, said sleeve having portions of relatively small and large diameters, a body of rubber between the inner face of the sleeve at its large diameter and the enclosed member, and a second body of rubber between the outer face of the sleeve at its small diameter and the other of said members, the bodies of rubber being held to the members and sleeve in such relation as to permit relative pivotal movement thereof by flexure of the rubber.

LUCIAN Q. MOFFITT.